United States Patent [19]

Sanderson et al.

[11] Patent Number: 5,460,827
[45] Date of Patent: Oct. 24, 1995

[54] ELONGATED CYLINDRICAL MEDICINAL TABLET HAVING TWO LAYERS

[75] Inventors: Richard Sanderson, McKeesport; Ronald Adams, Irwin, both of Pa.

[73] Assignee: Elizabeth-Hata International, Inc., North Huntingdon, Pa.

[21] Appl. No.: 978,638

[22] Filed: Nov. 19, 1992

Related U.S. Application Data

[60] Continuation of Ser. No. 793,639, Nov. 18, 1991, abandoned, which is a division of Ser. No. 684,696, Apr. 12, 1991, Pat. No. 5,158,728.

[51] Int. Cl.$^6$ .................................................. A61K 9/20
[52] U.S. Cl. .................. 424/472; 424/474; 264/113; 264/120; 425/345; 425/353
[58] Field of Search ................ 53/900; 424/472, 424/474; 425/345, 353; 264/113, 120

[56] References Cited

U.S. PATENT DOCUMENTS

| | | | |
|---|---|---|---|
| 2,068,619 | 1/1937 | Bailey | 107/17 |
| 2,350,971 | 6/1944 | Pecker et al. | 29/160 |
| 2,946,298 | 7/1960 | Doepel et al. | 107/1 |
| 3,118,183 | 1/1964 | Gex et al. | 18/20 |
| 3,158,109 | 11/1964 | Stott | 425/345 |
| 3,230,905 | 1/1966 | Gajda | 107/17 |
| 3,332,367 | 7/1967 | Sperry et al. | 107/17 |
| 3,483,831 | 12/1969 | Fujii et al. | 107/17 |
| 3,545,007 | 12/1970 | Hamilton | 107/17 |
| 3,555,608 | 1/1971 | Maekawa et al. | 18/20 |
| 3,663,147 | 5/1972 | Maekawa et al. | 425/345 |
| 3,840,631 | 10/1974 | Alexander | 264/113 |
| 4,057,381 | 11/1977 | Korsch | 425/345 |
| 4,104,014 | 8/1978 | Pearce | 425/345 |
| 4,362,493 | 12/1982 | Doepel | 425/345 |
| 4,832,880 | 5/1989 | Staniforth | 264/22 |
| 5,032,406 | 7/1991 | Dansereau | 424/472 |
| 5,089,270 | 2/1992 | Hampton et al. | 424/465 |

FOREIGN PATENT DOCUMENTS

| | | |
|---|---|---|
| 1016207 | 5/1983 | U.S.S.R. . |
| 2053787 | 2/1981 | United Kingdom . |

OTHER PUBLICATIONS

"Hata Rotary Tabletting Presses For The Pharmaceutical Industry" published by Elizabeth-Hata International, Inc.

*Primary Examiner*—Raj Bawa
*Attorney, Agent, or Firm*—Buchanan Ingersoll; George Raynovich, Jr.

[57] ABSTRACT

An apparatus for forming a generally cylindrical two-layer, vertically-compressed tablet having a longitudinal axis longer than its diameter is provided in which a generally cylindrical die cavity is provided on a die table with the longitudinal axis of the die cavity being vertically disposed. An upper punch provided above the die cavity rides on an upper cam assembly which controls the movement of the upper punch to and from the die cavity. A lower punch provided below the die cavity rides on a lower cam assembly which raises and lowers the lower punch relative to the die cavity. In operation, the lower punch is positioned and a first powder is added in a metered amount to the die cavity. The upper punch then tamps down the first powder within the die cavity. The lower punch is positioned to receive a metered amount of a second powder in the die cavity above the first powder. The powder in the die cavity is compressed by shifting pressure wheels which prevent the powders from adhering to the wall of the die cavity. After the powder is compressed to form a tablet, the tablet is ejected from die cavity and taken out an ejection chute.

3 Claims, 5 Drawing Sheets

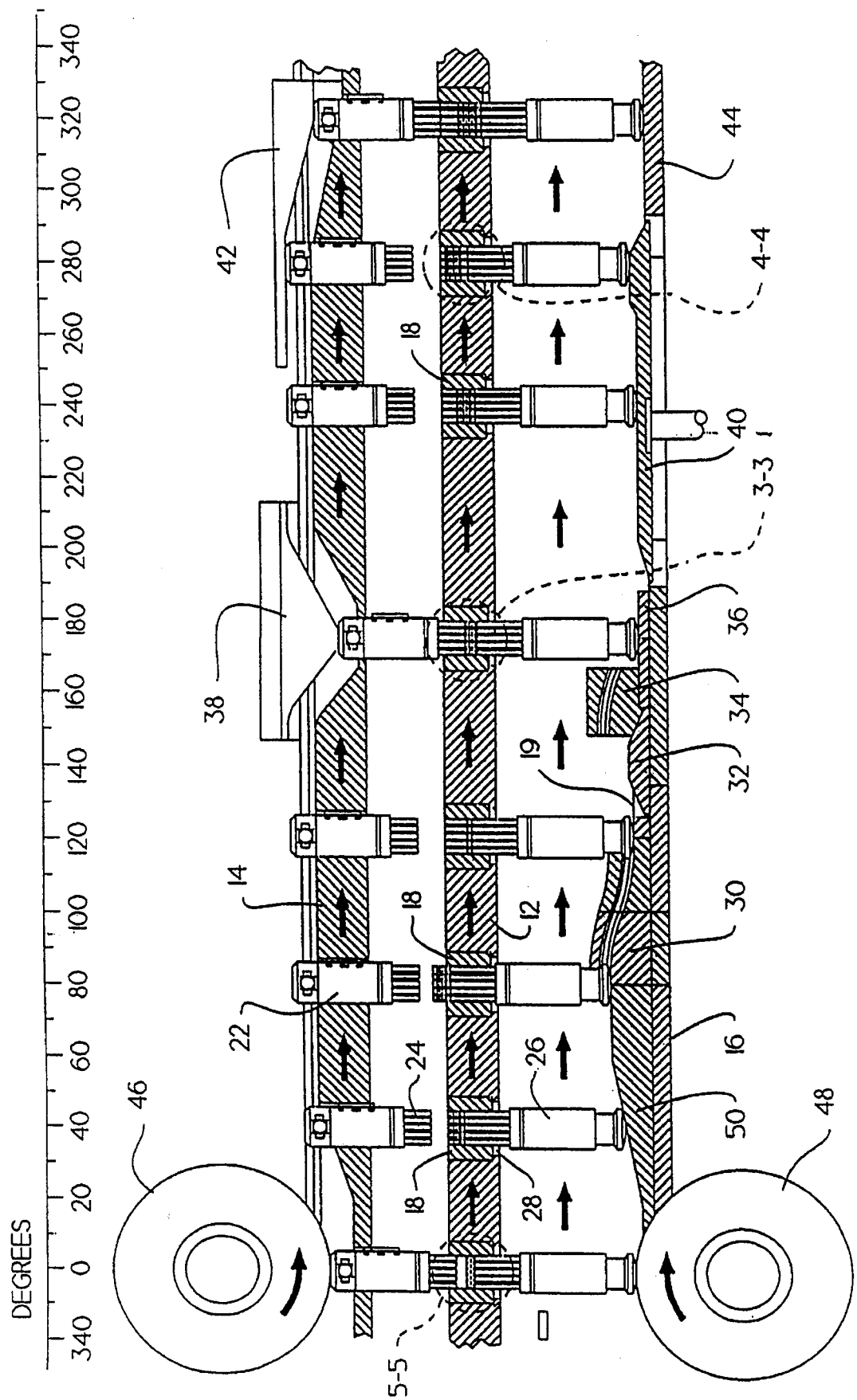

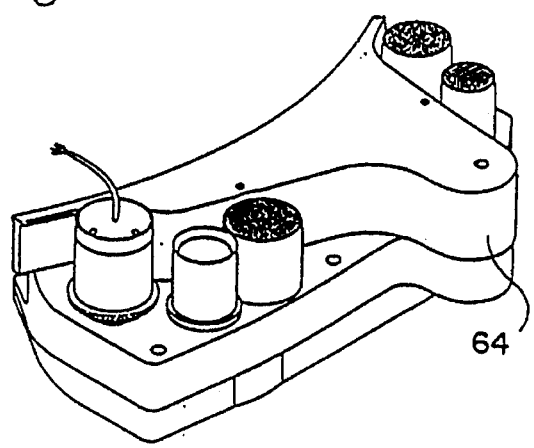
Fig.9a.
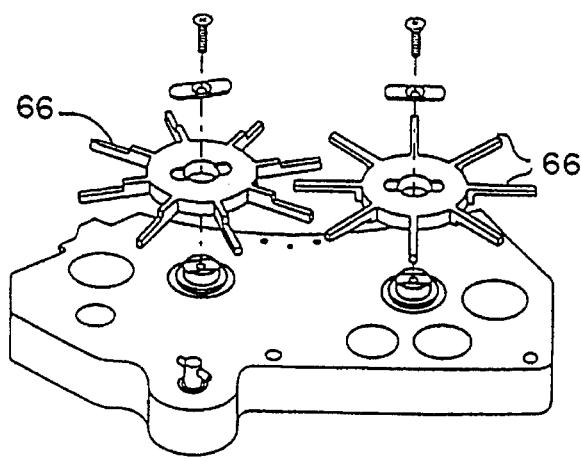
Fig.9b.
Fig.9c.
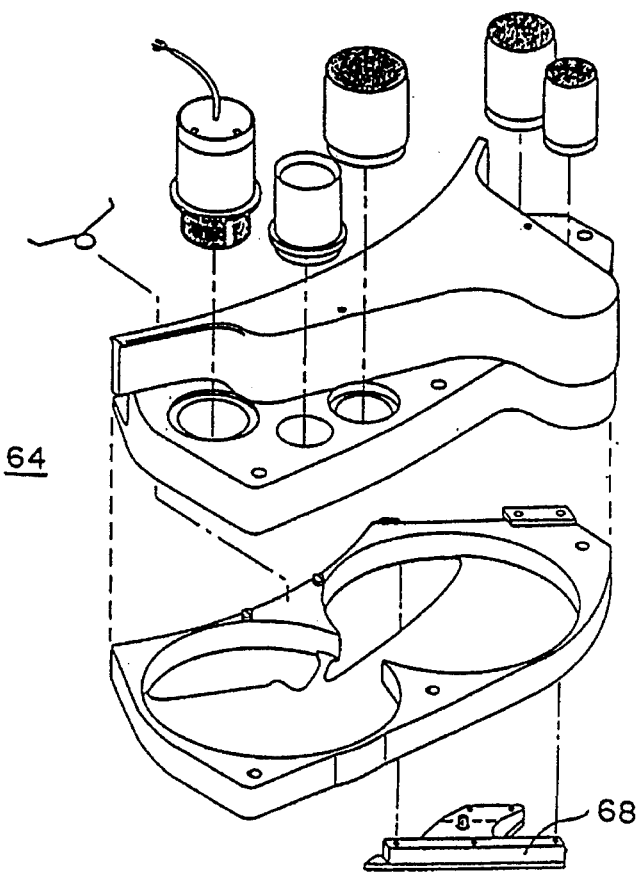

ELONGATED CYLINDRICAL MEDICINAL TABLET HAVING TWO LAYERS

This application is a continuation, of application Ser. No. 07/793,639, filed Nov. 18, 1991 now abandoned which is a division of Ser. No. 07/684,696 filed Apr. 12, 1991 and issued on Oct. 27, 1992 as U.S. Pat. No. 5,158,728.

BACKGROUND OF THE INVENTION

1. Field of the Invention

The present invention relates to a medicinal tablet forming machine and method for using the machine. More particularly, the present invention relates to a machine for forming a two-layer, generally cylindrical, vertically-compressed and vertically-aligned bandless tablet.

2. Description of the Prior Art

It is well known in the art that a tablet can be formed by compressing powder in a vertical press. It is also known that by application of appropriate metering mechanisms, a tablet composed of layers of at least two different materials can be formed in a vertical press. Such multi-component tablets formed in accordance with the prior art are frequently characterized by an intermixing of the components at the interface of the layers. Depending upon the components of the medicinal tablet, the intermixing of the components at tile interface of the layers may produce adverse results caused by long term incompatibility of the components in one another.

In the prior art, the manufacture of generally cylindrical multi-component tablets is accomplished in a vertical press with the longitudinal axis of the formed tablet being shorter than the diameter of the tablet. A vertically disposed generally cylindrical tablet having a longitudinal axis greater than the diameter suffers from the problem of incomplete hardening of the tablet during pressing. Surface tension which develops between the powder and the die cavity wall frequently prevents the complete compaction of the powder. The resulting tablet lacks sufficient strength in its midsection to withstand normal stresses, thereby causing the tablet to crack or break.

Because prior art cylindrical tablets require large diameters relative to the tablet volume, space is sacrificed on the die station. As a result, fewer tablets can be formed for a given die station size as the diameter of a tablet is increased relative to the longitudinal axis of the tablet.

A further problem associated with the prior art manufacture of multicomponent tablets concerns the transverse compression of the tablet. Such compression produces a band which runs along the surface of the tablet at the interface of the different components. In order to camouflage this band, cylindrical tablets are generally provided with unique geometries which incorporate the band in the design. A typical example of a prior art multiple component cylindrical tablet is shown in FIGS. 1a, 1b and 1c.

Because of the shape of the tablets shown in FIGS. 1a, 1b and 1c the layers of powders are disposed along the longitudinal axis of the tablet. This results in a tablet having a large surface area interface between the different components, affording a great opportunity for intermixing of the two layers.

It is an object of this invention to provide a generally cylindrical two-layer tablet in which the longitudinal axis of the tablet is greater than the tablet diameter.

It is a further object of this invention to provide an apparatus for forming a two-layer cylindrical tablet in which the longitudinal axis of the tablet is greater than the tablet diameter.

It is a still further object of this invention to provide a method for forming a two-layer cylindrical tablet in which the longitudinal axis of the tablet is greater than the tablet diameter.

SUMMARY OF THE INVENTION

An apparatus for forming a generally cylindrical two-layer, vertically compressed tablet is provided in which a die table includes a plurality of die stations each having at least one vertically disposed die cavity therein for forming the tablet. An upper punch means located above the die table is provided with at least one insert sized and positioned on the upper punch means to fit within the die cavity on the die on the die table. A lower punch means located below the die table is provided with at least one insert sized and positioned to also fit within the same die cavity.

The apparatus is provided with means to fill a metered amount of a first powder in the die cavity. Means are also provided for tamping the first powder in the die cavity. Means for providing a metered amount of a second powder in the die cavity are also provided.

The upper punch means and lower punch means are used to compress the first powder and second powder in the die cavity to form a tablet. Preferably, the upper and lower punch means are pressed by opposed upper and lower pressure wheels. Special shifting pressure wheels are used to press the punches. In the shifting pressure wheels, the upper pressure wheel is adjustable relative to the position of the lower pressure wheel with respect to the rotational direction of the die table. By advancing or retarding the upper pressure wheel with respect to the lower pressure wheel, the entry of the upper and lower inserts of the punch means are adjusted to provide an irregular pressure gradient acting to compact the powder. By delaying the entry of one of the inserts into the die cavity, the earlier entering insert is able to move the entire powder composition slightly to prevent the creation of surface tension between the formed tablet and the interior wall of the die cavity. In this manner, the shifting pressure wheel enables the medicinal tablet to be formed and removed from the die cavity without encountering frictional stresses which may cause the tablet to break upon ejection.

BRIEF DESCRIPTION OF THE DRAWINGS

FIG. 1b is a side elevational view of the cylindrical tablet of FIG. 1a.

FIG. 1c is an end view of the cylindrical tablet of FIG. 1a.

FIG. 2 is a schematic representation of the cam layout of a presently preferred embodiment of the tablet forming machine of the present invention.

FIG. 9a is an isometric top view of a feed shoe which can be used with the tablet forming machine of the present invention.

FIG. 9b is isometric bottom view of the feed shoe of FIG. 9a.

FIG. 9c is an exploded isometric view of the feed shoe of FIG. 9a.

DETAILED DESCRIPTION OF THE PREFERRED EMBODIMENTS

Figure 1A:
FIG. 1a is a top view of a generally cylindrical tablet formed in accordance with the prior art.
Figure 1B:
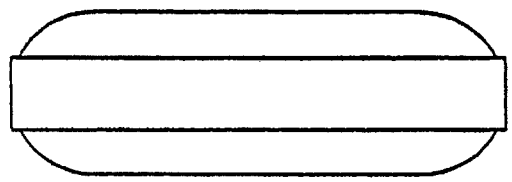
Figure 1C:
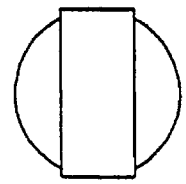

FIG. 2 shows the cam layout arrangement used on tablet press 10 of the present invention. As is shown on the scale along the upper margin of FIG. 2, tablet press 10 incorporates a turret in which a two-layer cylindrical tablet is formed during the 360° rotation of the turret.

Tablet press 10 includes die table 12 provided intermediate upper cam assembly 14 and lower cam assembly 16. Die table 12 is adapted to receive a plurality of die stations 18 (FIG. 7), each die station 18 having a plurality of die cavities 20 provided therein. Die cavities 20 are arranged in die station 18 such that the longitudinal axis of the cavities 20 are vertically disposed in die station 18. The longitudinal axis of each cavity 20 is longer than the diameter of cavity 20.

In a presently preferred embodiment, tablet press 10 is a thirty ton pressure capacity unit. Die table 12 is adapted to receive eighteen die stations 18. Each die station 18 is provided with seventeen die cavities 20. Tablet press 10 operates at approximately 10–20 revolutions per minute, thus producing between 3000 and 6000 tablets per minute. This compares favorably with standard pharmaceutical presses in which fifty-five single cavity die stations are provided on a machine which operates at 50–70 rpm, thereby producing between 2750 and 3850 tablets per minute. For ease of illustration, FIG. 2 shows eight of the eighteen die stations 18 provided on die table 12.

A plurality of upper punches 22 are adapted to ride along upper cam assembly 14. An upper punch 22 is provided above each die station 18. Each upper punch 22 is provided with a plurality of upper punch inserts 24 which are positioned above the die cavities 20 provided in each die station 18. In a like manner, a plurality of lower punches 26 are adapted to ride on lower cam assembly 16. A lower punch 26 is provided immediately below each die station 18 on die table 12. Each lower punch 26 is provided with a plurality of lower punch inserts 28 adapted to fit within the cavities 20 of each die station 18. The rotation of upper punches 22 on upper cam assembly 14 and lower punches 26 on lower cam assembly 16 are synchronized with the rotation of die stations 18 on die table 12.

Upper cam assembly 14 includes various components which position each upper punch 22 at a desired location to accomplish the formation of the multiple layer tablet. Lower cam assembly 16 positions each lower punch 26 at a desired location to assist in the formation of the multiple layer tablet. The individual components of upper cam assembly 14 and lower cam assembly 16 are discussed in more detail below with regard to the process of forming the multiple layer tablet.

In general, the process of producing a tablet includes the general steps of filling a die cavity with powder, metering the powder in the die cavity, pressing the powder in the die cavity to form a tablet, and ejecting the formed tablet from the die cavity. Where multiple component tablets are formed, the steps are modified for filling and metering powders of each of the individual components.

In the present invention, lower punch 26 is positioned by first layer fill cam 30 to permit a first powder 52 to be introduced into die cavities 20. First powder 52 is applied to a feed shoe 64 (FIG. 9a) provided on die table 12. Means well known in the art, such as paddle wheels 66 (FIG. 9b), distribute the first powder 52 over the entire upper surface of die station 18, thereby assuring that each die cavity 20 provided in die station 18 is filled with first powder 52. After first powder 52 is received into die cavities 20, lower punch 26 engages first layer dosing cam 32 which raises lower punch 26 relative to first layer fill cam 30. By raising lower punch 26, lower punch inserts 28 force a portion of powder 52 out of die cavities 20. This excess expelled first powder 52 is swept off the top surface of die station 18 by means of a scraper 68 (FIG. 9c) provided on feed shoe 64 which is well known in the art. A vacuum block station (not shown) may be provided on die table 12 to remove any stray first powder 52 which rests on the upper surface of each die station 18.

The operation of first layer fill cam 30 and first layer dosing cam 32 assures that each die cavity 20 is provided with a metered amount of first powder 52. First layer fill cam 30 positions lower punch 26 at a height relative to die station 18 such that an excess amount of first powder 52 is provided into each die cavity 20. The precise positioning of lower punch 26 by first layer dosing cam 32 assures that the desired metered amount of first powder 52 is provided in die cavity 20.

Figure 3:
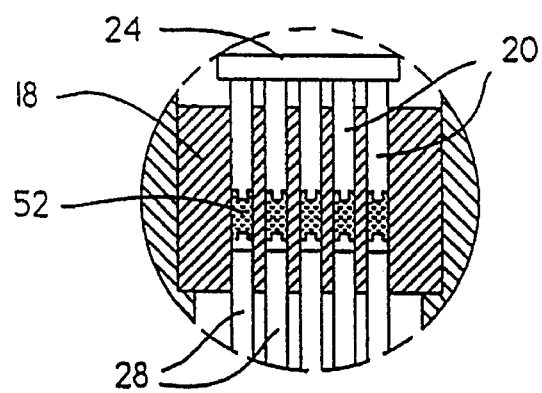
FIG. 3 is an enlarged view of die cavity A—A of FIG. 2 showing the tamping of the first lower dose.

After a metered amount of first powder 52 is provided in each die cavity 20 of a die station 18, the first powder 52 is tamped by upper punch inserts 24. This tamping process produces a generally level upper surface to the first powder 52 within each die cavity 20. The tamping of the first powder 52 is accomplished by lowering lower punch 26 by means of lowering plate 34 and carrying lower punch 26 to flat tamping plate 36. Upper punch 22 rides on tamping lowering cam 38 which lowers upper punch inserts 24 into die cavities 20. No pressure is added to upper punch 22 during the tamping process. Rather, the force of gravity acting on upper punch 22 provides the necessary force to tamp first powder 52 in each die cavity 20. FIG. 3 shows the tamping of first powder 52 in each die cavity 20 of die station 18.

Figure 4:
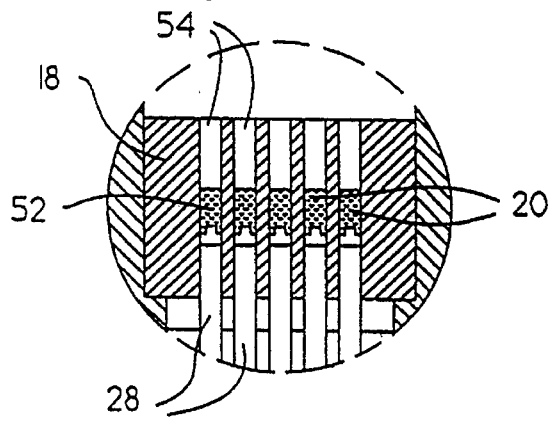
FIG. 4 is an enlarged view of die cavity B—B of FIG. 2 showing the addition of the second layer dose.

After first powder 52 has been tamped, tamping cam 38 raises upper punch 22 to provide clear access to the top surface of die station 18. Lower punch 26 is then positioned by second layer dosing cam 40. A second powder 54 is added in a second feed shoe 64 (FIG. 9a) provided on die table 12 above second layer dosing cam 40. Second layer dosing cam 40 positions lower punch 26 at a height whereat the volume of free space in each die cavity 20 above first powder 52 corresponds to the desired amount of second powder 54 to be provided to each die cavity 20. In this manner, precise metering of the amount of second powder 54 added to each tablet is provided. FIG. 4 shows die station 18 arranged to accept the addition of second powder 54.

After the metered amount of second powder 54 is added to die cavity 20, powders 52 and 54 are compressed in die cavity 20. Lowering cam 42 positions upper punch 22 in position for being pressed. Lower punch 26 rides on carry plate 44 to the pressure means.

Figure 5:
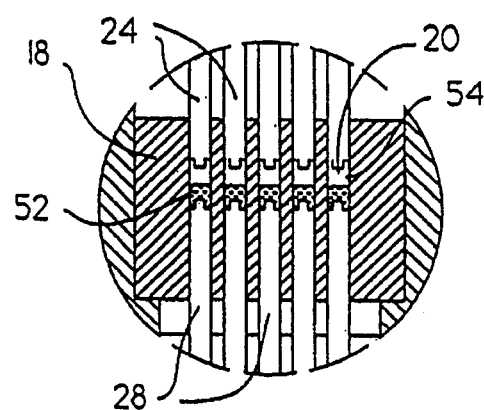
FIG. 5 is an enlarged view of die cavity C—C of FIG. 2 showing full compression of the first and second layer doses.

Powders 52 and 54 are compressed in each die cavity 20 to form a tablet by means of shifting pressure wheels which press on upper punch 22 and lower punch 26. The shifting pressure wheels include an adjustable upper pressure roll 46 and a lower pressure roll 48. Pressures rolls 46 and 48 impart pressure on upper punch 22 and lower punch 26, respectively, to compress first powder 52 and second powder 54 to form a cylindrical tablet in each die cavity 20. FIG. 5 shows die station 18 under full compression.

Adjustable upper pressure roll 46 is encased in a housing that rotates about the center of the turret of tablet press 10. Adjustable upper pressure roll 46 can either be advanced or retarded against the direction of rotation of die table 12. When adjustable upper pressure roll 46 is advanced, upper punch 22 is introduced first into each die cavity 20 resulting in increased pressure on lower punch 26. When adjustable upper pressure roll 46 is retarded, lower punch 26 is introduced first into each die cavity 20 and increased pressure results on upper punch 22.

Adjustable upper pressure roll 46 allows for a delayed pressure to be developed in the compression of powder 52 and powder 54. If upper pressure roll 46 and lower pressure roll 48 are positioned to provide equal pressure to upper punch 22 and lower punch 26, the resulting tablet that is formed will be soft in the middle. Friction which develops between the powder and the wall of a die cavity 20 hinders the complete and full compression of the powder within that die cavity 20. When upper pressure roll 46 is adjusted, full pressure on powder 52 and 54 is delayed. This permits the first punch to engage the powder to slide the powder compact prior to full compression in an effort to overcome die wall friction. This provides a harder, more solid tablet.

Figure 6:
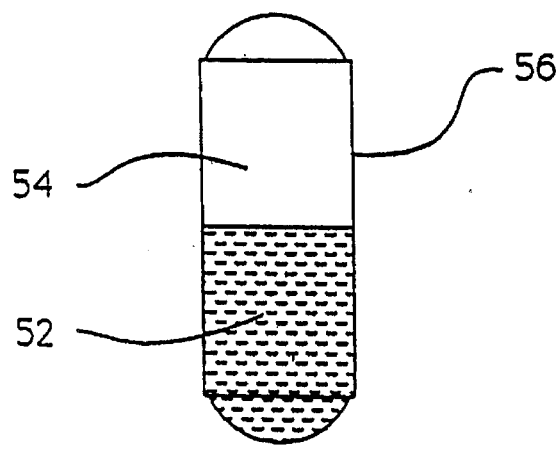
FIG. 6 is an elevational view of the cylindrical tablet formed in accordance with the present invention.

Once each two-layer tablet 56, shown in FIG. 6, is formed, the tablet must be ejected from its die cavity 20. The ejection of the tablet 56 is accomplished by raising upper punch 22 by riding it on the back side of lowering cam 42. Lower punch 26 is raised by ejection cam 50. The ejection Cam 50 gradually raises tablets 56 out of die cavities 20. A scraper provided on a take-off unit tips over each of the tablets 56. The rotation of die table 12 causes tablets 56 to engage a take-off chute through which tablets 56 are fed out of tablet press 10. Each tablet 56 is tipped over as it hits the back of the scraper to prevent the shearing of the tablet 56 which would otherwise occur.

Figure 7:
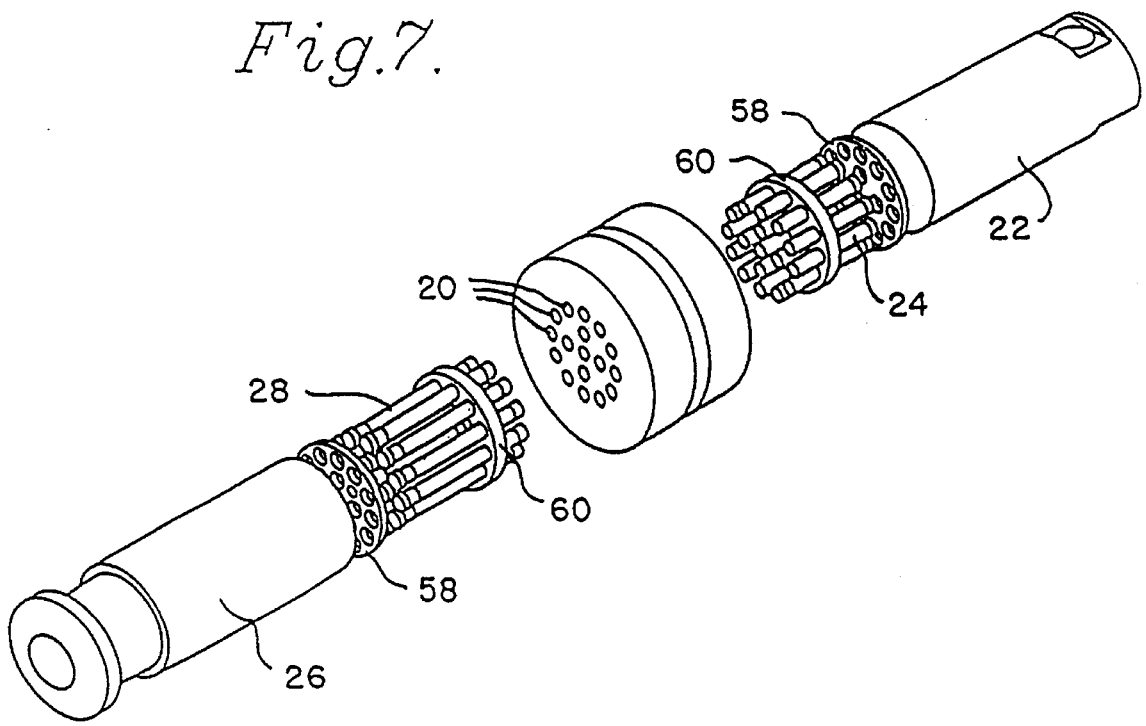
FIG. 7 is an exploded isometric view of the upper and lower punch and die of the present invention.

FIG. 7 shows a preferred embodiment of lower punch 26, upper punch 24, and die station 18. As shown in FIG. 7, lower punch 26 includes spacer plate 58, lower punch inserts 28 and location plate 60. Location plate 60 arranges each of the lower punch inserts 28 in a pattern similar to the arrangement of die cavities 20 in die station 18. In a like manner, upper punch 22 includes spacer plate 58, upper punch inserts 28 and location plate 60 which arranges the upper punch inserts 24 in a pattern similar to the pattern of die cavities 20 in die station 18. Die cavities 20 are arranged in die station 18 such that a generally cylindrical tablet is formed therein. Upper punch insert 24 and lower punch insert 28 compress each tablet 56 along its vertical axis.

Figure 8:
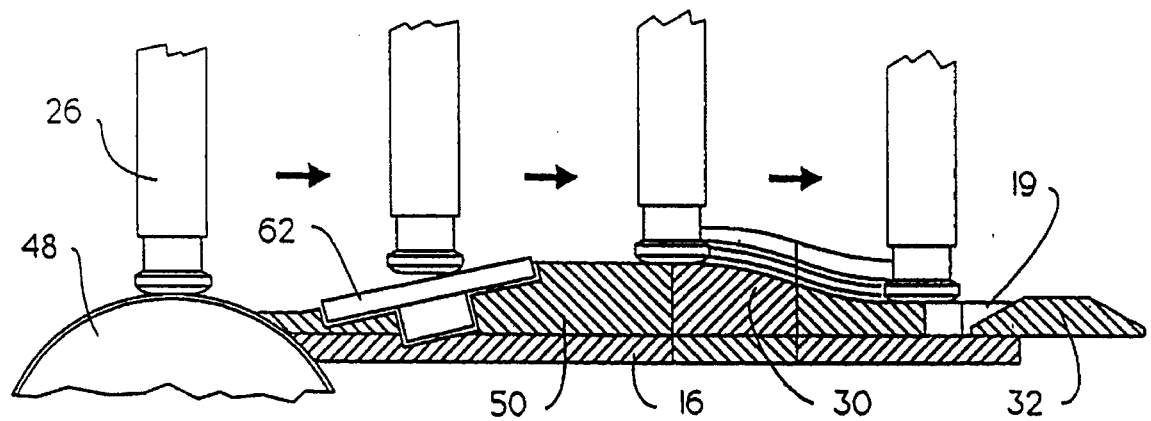
FIG. 8 is a schematic view of an alternative embodiment of the ejection cam of FIG. 2.

FIG. 8 shows an alternative embodiment of ejection cam 50 for use on lower cam assembly 16. In the alternative embodiment of FIG. 8, a rotatable plate 62 is provided on ejection cam 50. Rotatable plate 62 is supported by bearings on ejection cam 50 and is free to rotate relative thereto. When lower punch 26 engages rotatable plate 62, lower punch 26 is jerked by the rotatable movement of plate 62. This jerking action on lower punch 26 assists in jerking tablet 56 within die cavity 20. This hard jerking action breaks any surface tension between tablet 56 and the interior wall of die cavity 20, thereby assisting in the ejection of tablet 56 from die cavity 20.

By using the above-described apparatus and method, a generally cylindrical multiple component tablet 56 can be formed in a vertical press in a vertically-aligned disposition. The resulting tablet 56 is bandless because it is formed in a one-piece die cavity 20. Because the layers of powder 52 and 54 are disposed axially in tablet 56, the interface between the different powders is kept to a minimum.

In the foregoing specification certain preferred practices and embodiments of this invention have been set out, however, it will be understood that the invention may be otherwise practiced within the scope of the following claims.

We claim:

1. A two-layer, vertically-compressed tablet having a longitudinal axis longer than its diameter formed by a process comprising the steps of:

a. metering a first powder in a die cavity provided in a die station on a die table by adding said first powder into said die cavity, positioning a lower punch means in engagement with a first layer dosing cam, and scraping any excess of said first powder from over said die cavity;

b. tamping said first powder in said die cavity by positioning said lower punch means in engagement with a first tamping plate and lowering an upper punch means into said die cavity, said tamping providing a generally level upper surface to said first powder in said die cavity;

c. metering a second powder into said die cavity by positioning said lower punch means in engagement with a second layer dosing cam, adding said second powder into said die cavity, and scraping any excess of said second powder from over said die cavity;

d. pressing said first powder and said second powder in said die cavity to form a compressed tablet by providing an upper pressure wheel above said upper punch means and a lower pressure wheel below said lower punch means, pressing said upper pressure wheel on said upper punch means, pressing said lower pressure wheel on said lower punch means, and compressing said first powder and said second powder in said die cavity and adjusting at least one of said upper and lower pressure wheels relative to the position of the other pressure wheel with respect to the direction of rotation of the die table such that said upper pressure wheel presses said upper punch means at a different time than said lower pressure wheel presses said lower punch means; and e. ejecting said compressed tablet from said die cavity.

2. The tablet of claim 1 wherein said upper punch means comprises a plurality of punches provided above said die table, each of said plurality of punches adapted to ride on an upper cam assembly, each of said plurality of punches positioned above one of a plurality of die stations provided on said die table, each of said plurality of punches provided with at least one insert sized and positioned to fit within at least one die cavity provided in each of said plurality of die stations.

3. The tablet of claim 1 wherein said lower punch means comprises a plurality of punches provided below said die table, said plurality of punches adapted to ride on a lower cam assembly which includes said first layer dosing cam, said tamping plate, and said second layer dosing cam, each of said plurality of punches positioned below one of a plurality of die stations provided on said die table, each of said plurality of punches provided with at least one insert sized and positioned to fit within at least one die cavity provided in each of said plurality of die stations.

* * * * *